Dec. 26, 1967    D. V. ANDERSON ETAL    3,359,595
ROLLER DEVICE FOR REMOVING THE MEAT FROM KING CRAB LEGS
Original Filed March 20, 1961    6 Sheets-Sheet 6
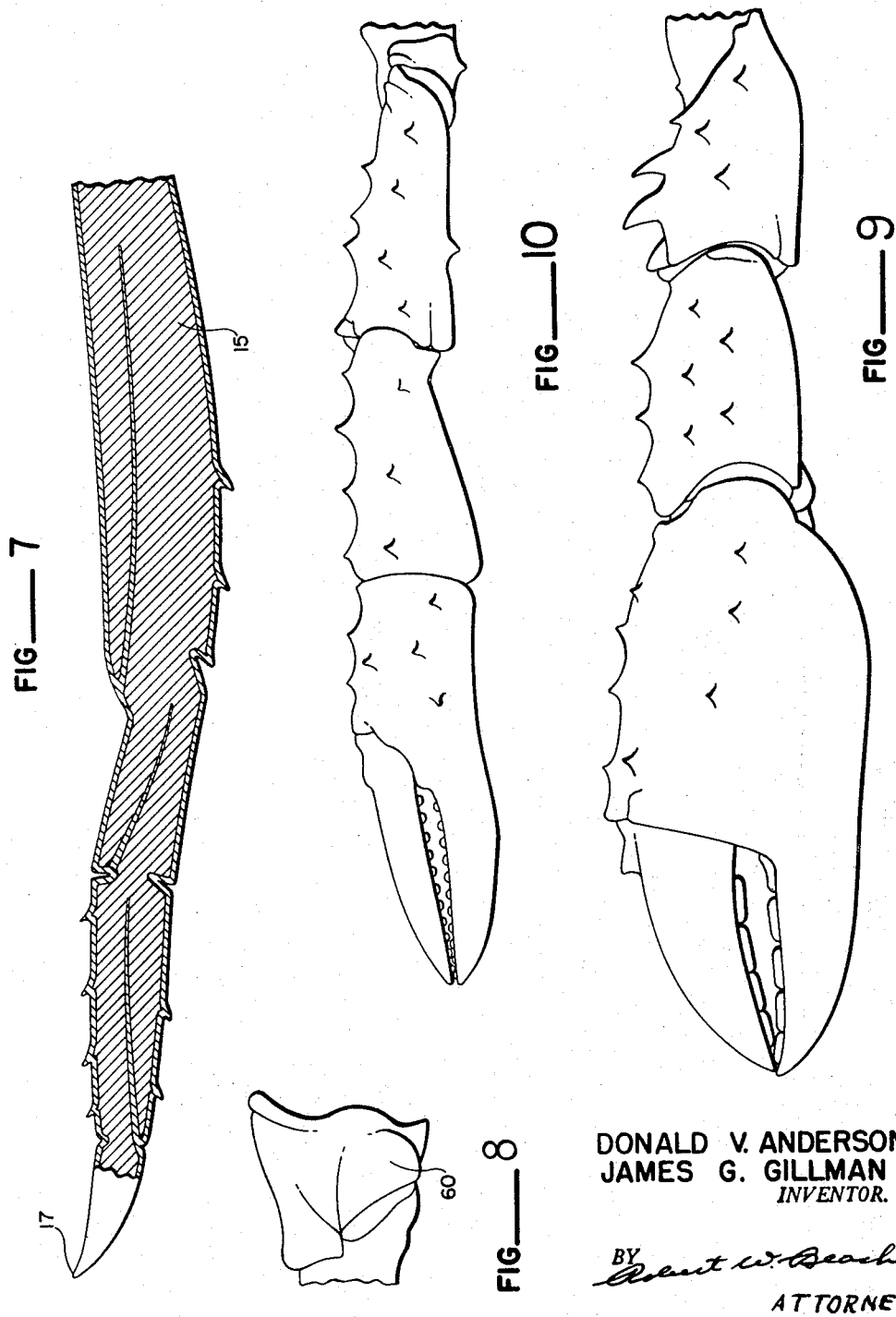
DONALD V. ANDERSON
JAMES G. GILLMAN
*INVENTOR.*
BY
ATTORNEY United States Patent Office 3,359,595
Patented Dec. 26, 1967

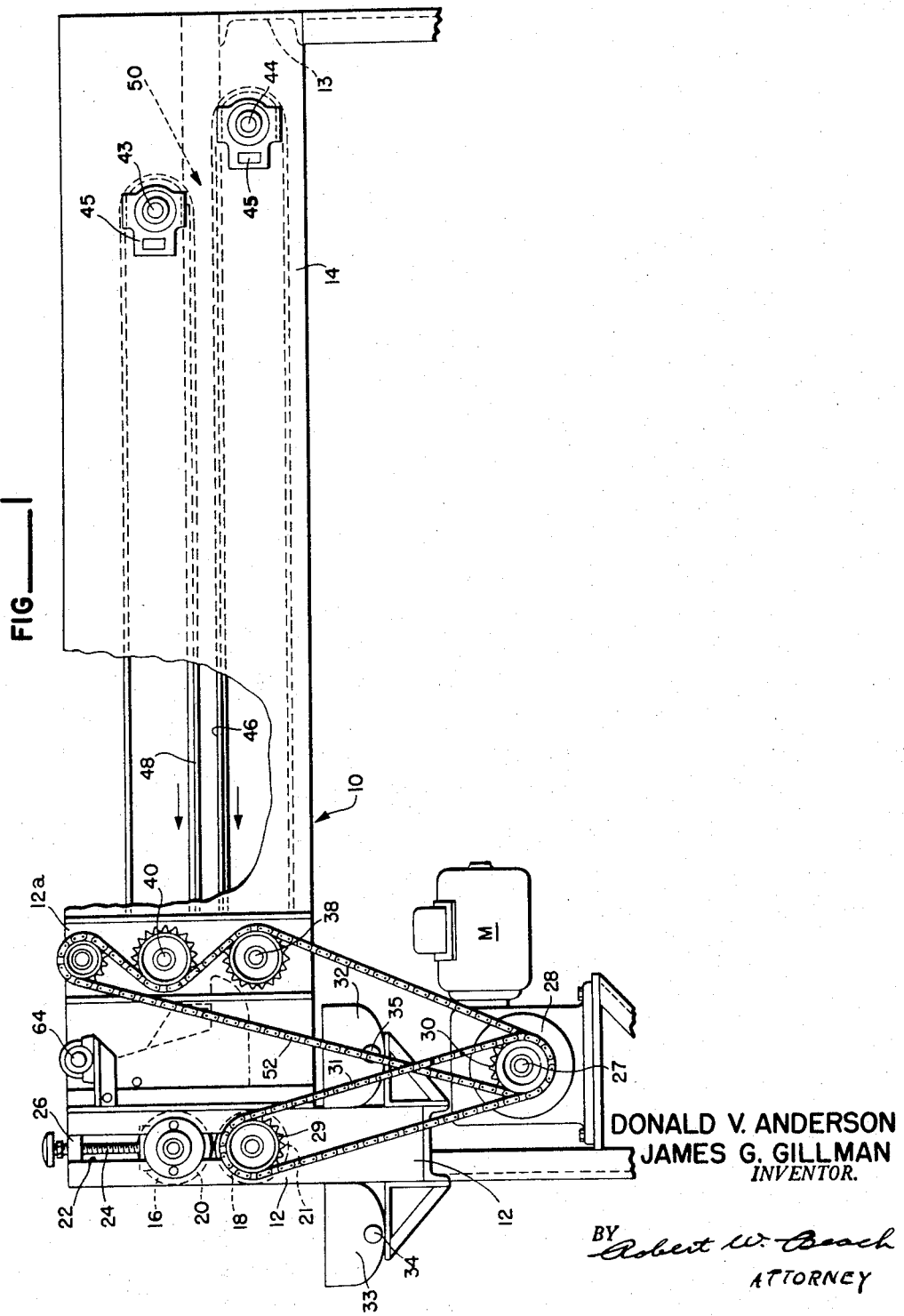

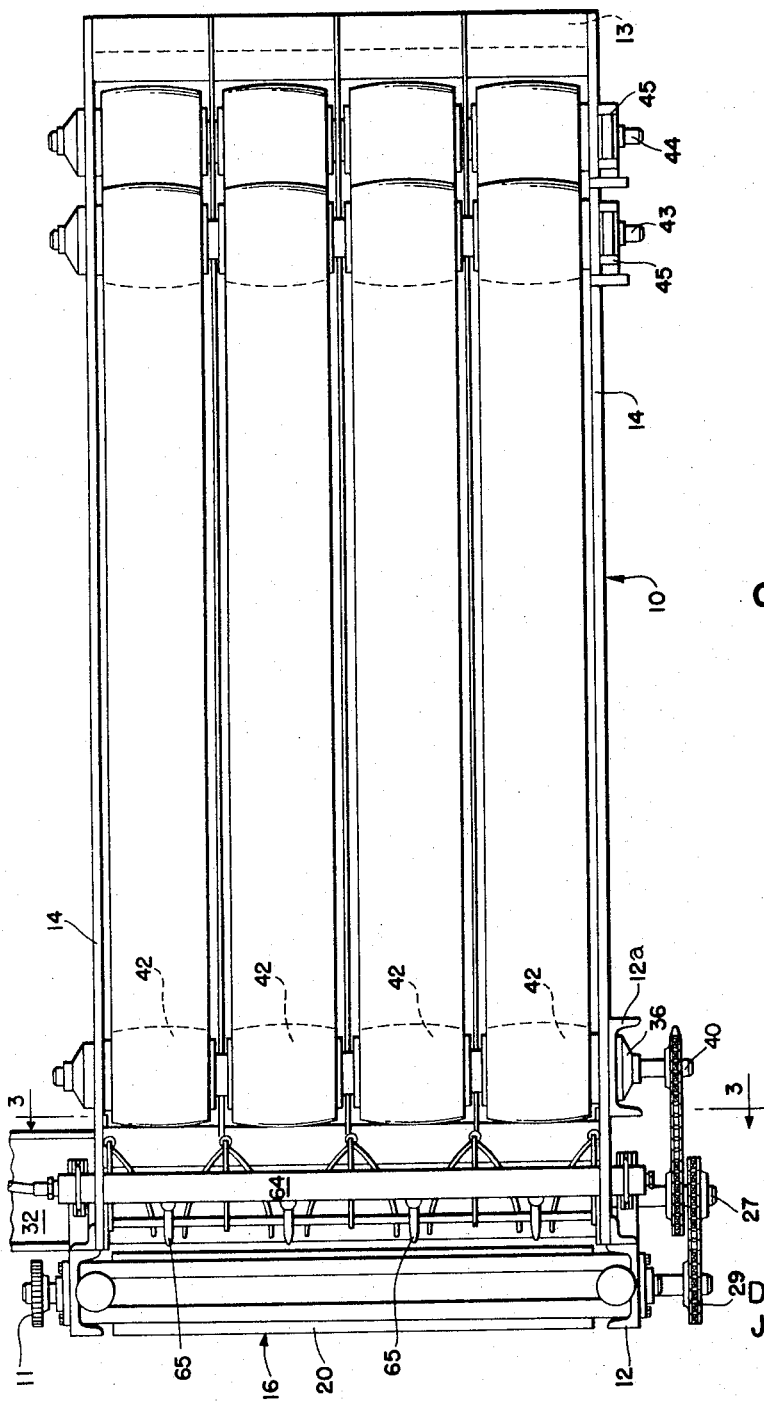

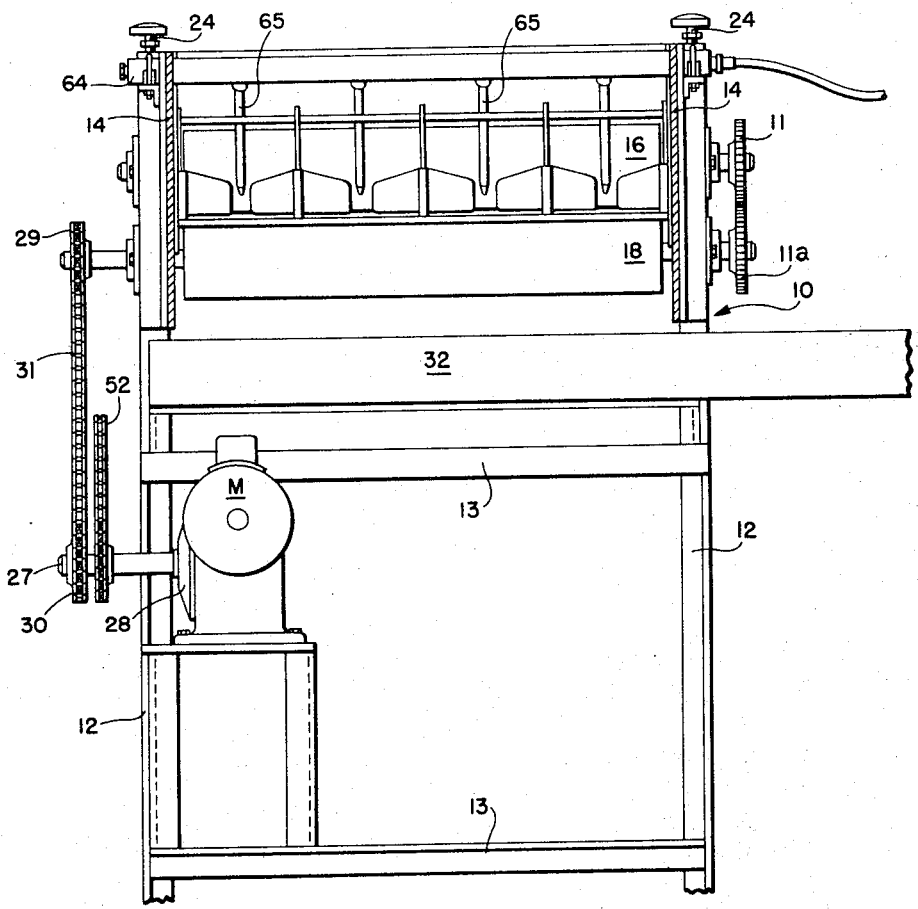
FIG__3

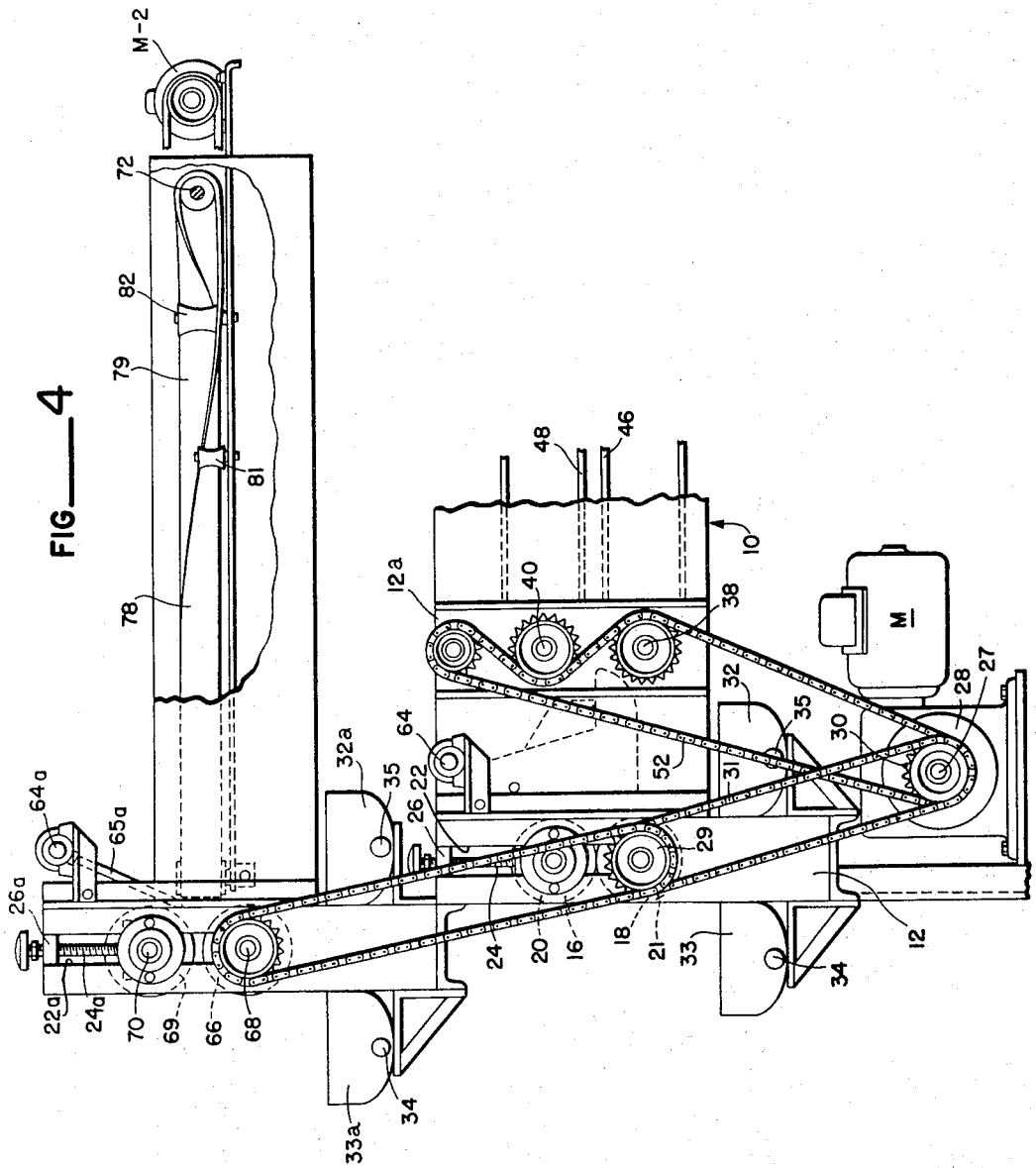

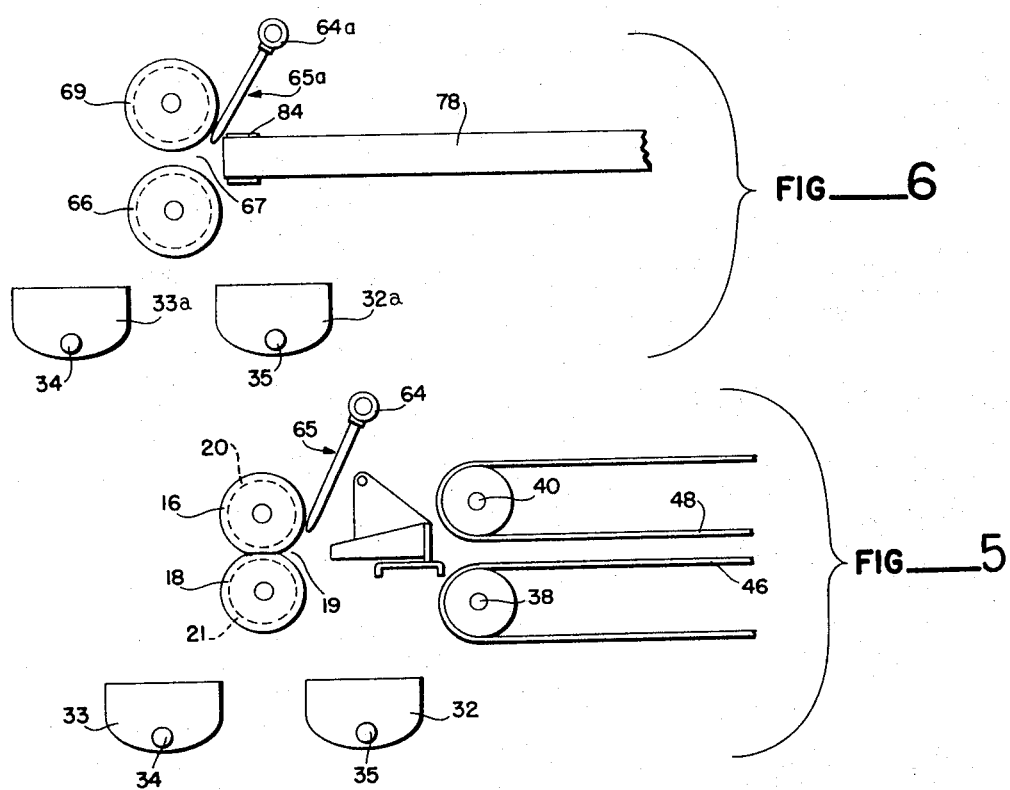

3,359,595
ROLLER DEVICE FOR REMOVING THE MEAT FROM KING CRAB LEGS
Donald Victor Anderson, Port Orford, Oreg., and James G. Gillman, Hemet, Calif., assignors of thirty percent to Wayne Luders and ten percent to Paul D. Jackson
Continuation of application Ser. No. 545,214, Apr. 20, 1966, which is a continuation of application Ser. No. 465,290, June 21, 1965, which is a division of application Ser. No. 331,452, Dec. 18, 1963, now Patent No. 3,256,556, dated June 21, 1966, which is a continuation of application Ser. No. 97,090, Mar. 20, 1961. This application Dec. 27, 1966, Ser. No. 605,080
3 Claims. (Cl. 17—2)

This application is a continuation of patent application Ser. No. 545,214 filed Apr. 20, 1966, now abandoned, which was a continuation of patent application Ser. No. 465,290, filed June 21, 1965, now abandoned, which application was a division of our patent application Ser. No. 331,452, filed Dec. 18, 1963, issued as Patent No. 3,256,556, on June 21, 1966 for Device for Removing the Meat from King Crab Legs, which application is a continuation of our patent application Ser. No. 97,090, filed Mar. 20, 1961, for Device for Removing the Meat from King Crab Legs, now abandoned.

This invention relates to a device of the roller type for removing the edible meat from the legs and claws of king crab, which legs may be as much as 20 inches in length and up to two inches in diameter in parts.

In the past the edible meat has been removed from king crab legs by hand operation, which is very wasteful of the crab meat. The hand operation is normally aided only by supplying some means for introducing a jet of air, or preferably of water, at the small end of a leg severed from the crab body to blow the meat out of the legs. Applying pressure to the end of a column of meat which might be from twelve to eighteen inches long caused a compacting of the meat and added to the difficulty of forcing it out of the long tubular shell. A further complication resulted from the presence of long tough tendons extending lengthwise through the legs, which tie the muscles to the leg joints so that the joints can be manipulated. These tendons taper, the large end being secured to the shell of the leg and the free end being bonded to the muscles and extending toward the large end of the crab leg. As a result of the difficulties involved in the removal of the meat from king crab legs the average person could remove only about sixty pounds of meat per hour, and a very experienced person, working under the most ideal conditions, could only remove as much as one hundred pounds an hour.

The necessity for so much manual labor in the removal of king crab leg and claw meat added materially not only to the cost of processing the meat but also to the price paid by the ultimate consumer. The meat of king crab legs and claws is of good size and is an excellent food but the difficulty and expense of processing it has in the past greatly curtailed its commercial sale. Use of the present device results in an appreciable reduction in the cost of extracting such meat.

The principal object of this present invention, therefore, is to provide means for mechanically applying resilient pressure to the small end of a king crab leg by coacting rollers so that the meat will be squeezed out of the full length of the leg shell normally in a single connected piece.

A further object is to provide means for the pressure expulsion of the edible meat from a king crab leg by which the pressure is applied first to a portion of the leg adjacent to the large end of each of the various tendons and moved progressively toward the small end of the tendons in the progressive expulsion of the meat from the shell so that the meat is stripped off the tendons as the meat is pushed out of the shell, thus making it possible to remove all of the meat from a single leg as one connected piece.

Another object is to provide resiliently faced pressure rollers mounted with their axes in fixed parallel relationship which operate to squeeze the meat out of the shell of a king crab leg or claw.

A further object of this invention is to provide preferably two pairs of coacting rollers which are spaced apart sufficiently so that two separate feeding means may be provided, one for each set of rollers, yet such sets of rollers being disposed close enough together so that a person can selectively place a portion of a crab leg on the feeding means to one set of rollers or a large leg or claw on the feeding means to the other set of rollers.

This machine comprises one or more sets of resiliently faced rollers which are used in coacting pairs to squeeze the meat out of the long legs of king crabs. The axes on which the rollers revolve are fixed with respect to each other. The machine preferably combines two coacting pairs of rollers; the rollers of one pair are in contact throughout their lengths to accept the long section of the leg and the rollers of the other pair are spaced apart sufficiently to accept under pressure the large knuckle portion at the large end of the leg and claws. Rollers four inches in diameter can be used for removing meat from legs of a crab which vary in diameter from one-half inch at the small end to an inch at the large end where the knuckle is broken off. The rollers for handling claws and knuckle portions, which may be an inch and a half or more in diameter, should be larger, such as five inches in diameter. Means are combined with these pairs of rollers for the accurate and remote feeding of the crab parts into the nip between the coacting rollers of a pair.

FIGURE 1 is a side elevation of our crab leg meat extracting machine with the frame partially broken away to expose the belt conveying arrangement, the form shown in this figure being designed to operate on only the legs of the crab after the knuckles have been removed.

FIGURE 2 is a top plan of the device shown in FIGURE 1 with certain parts removed for clarity in showing the belt arrangements.

FIGURE 3 is a transverse, vertical section taken along the line 3—3 of FIGURE 2.

FIGURE 4 is a side elevation of a complete machine with equipment for feeding the crab legs being broken away, the portion of the machine particularly adaptable for squeezing the meat from the leg knuckles and the claws being located above the position for processing the smaller portions of the crab leg.

FIGURE 5 is a diagrammatic elevation showing the relationship between the rollers, the leg conveying belts, the meat and shell receiving troughs and the water jets for removing the meat from king crab legs.

FIGURE 6 is a diagrammatic elevation showing the relationship between the belts, the rollers, the water jets and the meat and shell receiving troughs used for the knuckles and claws of king crabs.

FIGURE 7 is a longitudinal section through the major portion of the length of a king crab leg including the tip, showing the heavy tendons attaching the muscle to the joints of the crab leg.

FIGURE 8 is an elevation of the knuckle portion at the root of the crab leg broken from the remainder of the leg for separate cleaning.

FIGURE 9 is an elevation of the right claw of the king crab, and FIGURE 10 is an elevation of the left claw which habitually is smaller than the right claw.

A metal fabricated frame 10 shown in FIGURES 1 and 3 includes a plurality of vertical members 12, transverse members 13 and longitudinal members 14. The transverse members serve as mounting means for much of the equipment, including the motor M. The form of machine illustrated in FIGURE 1 is utilized for squeezing the meat out of the long king crab legs 15 in FIGURE 7. These legs are usually 18 to 20 inches in over-all length. FIGURE 4 shows, superimposed over the crab leg cleaning portion of the machine, means for squeezing the meat out of the knuckles forming the root ends of the legs and constituting the joints where they are secured to the crab body. These knuckles are often an inch and a half or more in diameter, whereas the average diameter of the remainder of the crab leg varies from about one-half inch at the small end next to the tip to an inch at the large end where the knuckle is broken off. The claws of the crab are relatively short but quite thick.

Experience has shown that it is preferable not to use the same machine for removing the meat from both the major portions of the crab legs and from the leg knuckles and claws. The crab legs are normally complete when given to the workman and, as a first step, the knuckles are broken off the legs. It is most economical of both time and effort if the legs can be conveniently fed to one machine and the knuckles and claws fed to another machine within easy reach of the workmen. It is for this reason that FIGURE 4 shows a combination of the two machines for processing separately the different portions of the entire crab legs and the claws.

The crab leg portion of the machine is best illustrated in FIGURES 1, 2 and 3. Rotative in bearings secured to the vertical frame members 12 are two rubber-faced rollers 16 and 18. The peripheries of these rollers are normally in reasonably firm contact to provide a nip 19 shown in FIGURE 5 on the infeed side of such rollers. Into such nip can be moved the very tip 17 of a crab leg claw toward which the long crab leg tapers, as shown in FIGURE 7. The larger the diameter of such rollers 16 and 18, the smaller will be the angle included between the surfaces of such rollers which engage the crab leg tip. Such engagement must be sufficiently good to grip the tip of the leg and draw it between the rollers for crushing the shell of the crab leg. The pressure of the rollers must also have the effect on the meat column within the leg of wedging it toward the larger end of the leg as the leg moves tip first between the rollers. By this action the meat is expressed from the leg shell instead of passing between the rollers. Rollers having an outside diameter of at least four inches are satisfactory for this purpose.

Rubber roller facing assists greatly in enabling the rollers to grip the tip of the crab leg effectively so that at least one of such rollers must have such a resilient facing. It is, of course, well known that various synthetics or plastics may be used to provide a suitable resilient rubber-like roller covering. The facing material may, for example, have the general properties of Number 20 temper of neoprene synthetic rubber. It is essential that the material be relatively dense so that there are no voids in which small particles of crab meat or dirt would tend to lodge.

To provide a satisfactory grip on the tip of the crab leg the resilient roller facing must be capable of yielding resiliently to a sufficient degree so as to embrace to a substantial extent the tip of a crab leg to effect its passage between the rollers. The resilient facing on the metal core of a roller should therefore be in excess of one-half inch in thickness and preferably the combined thicknesses of the facings on the two rollers 16 and 18 would be equal to at least one inch. The thicknesses of the facings 20 and 21 on rollers 16 and 18 in FIGURE 5 of the drawings are indicated as being equal.

The rollers 16 and 18 are rotatively supported in end bearings slidable in a slot 22 in the upright frame member 12, as shown in FIGURE 1. The bearings for the lower roller 18 may be supported in the lower end of slot 22, and the bearings for roller 16 may be slid down such slot until the roller peripheries are in engagement. A follower thrust screw 24 engageable with the bearings of the upper roller 16 may be tightened sufficiently to prevent the upper roller from being raised appreciably even by the pressure produced by several large crab legs being passed between the rollers simultaneously. Such screw is threaded through the fixed thrust block 26. It is not desirable to provide resilient means pressing the rollers 16 and 18 toward each other, which would permit such rollers to separate appreciably. Instead, reliance is placed upon the resiliency of the roller facing to provide adequate engagement with the crab leg. Holding the rollers in close proximity as the crab leg passes between them will effect complete expulsion of the meat from the crab leg shell.

As shown in FIGURES 1, 3 and 4, the lower roller 18 can be driven by an electric motor M coupled to the speed reducer 28. A sprocket 29 fixed on the shaft of roller 18 and sprocket 30 on the speed reduced shaft 27 are connected by chain 31. If the peripheries of the rollers 16 and 18 are not pressed tightly into engagement so that the roller 16 will be driven frictionally by the roller 18, the two roller shafts can be connected for positive rotation in opposite directions by gears 11 and 11a shown in FIGURE 3.

The meat collecting trough 32 and the shell collecting trough 33 are mounted on brackets attached to opposite sides of the vertical frame 12, as shown in FIGURES 1 and 4. As a crab leg passes into the nip 19 of the rollers 16 and 18 at their feed side the meat of the crab leg is squeezed away from the leg tip, which shears the meat from the inner side of the shell and strips it from the tendons, so that the meat emerges progressively from the large end of the meat shell at the feed side of the rollers and falls into the meat collecting trough 32. The empty shell, flattened by its passage between the rollers 16 and 18, is discharged at the side of the rollers opposite the nip 19 and drops into the shell collecting trough 33. Troughs 32 and 33 preferably slope slightly lengthwise. Water supplied to the troughs by pipes 34 and 35 at their high ends will flush all the meat and the shells out of the troughs. Sluicing the meat from the machine in this manner handles it gently so that the large pieces, in most cases the entire column of meat expressed from a single leg, will not be broken up.

A water supply pipe 64 extends across the machine above and parallel to the rollers 16 and 18, as shown in FIGURES 1, 2, 3, 4 and 5. From this pipe a plurality of short pipes 65, preferably of flexible tubing, project downward. These short pipes can be adjusted to direct water jets into the nip 19 at the feed side of the rollers as shown in FIGURE 5. The force of such jets will be sufficient to wash any meat from the surface of the rollers 16 and 18 into the meat collecting trough 32. Also such jets assist in washing particles of meat and fragments of shell from the roller surfaces to cleanse them.

In order to bring the crab legs to the pressure rollers, from a point away from the machine, longitudinal members 14 are provided which in turn are normally secured to both the vertical and transverse frame members 12 and 13 as by welding thereto. Journaled in bearings 36, which are secured to secondary vertical frame member 12a, is a lower pulley shaft 38 and an upper pulley shaft 40. These shafts, in the form of our machine illustrated, each have mounted thereon four belt pulleys 42 as shown in FIGURE 2. At the opposite end of the machine there are again two separate pulley shafts as 43 and 44. These shafts are provided at each side with adjustable take-up devices 45 so that the belts which are operatively supported by the shafts 38 and 44 and 40 and 43, respectively, can be adjusted for proper tension.

Referring particularly to FIGURE 1, it will be noted that the upper run of platform belts 46 and the lower run of positioning belts 48 both run at the same speed and in the same direction, which is toward the meat-removing pressure rollers 16 and 18. It has been found desirable to have the legs introduced at a point substantially at 50 between the two belts, and, with the shafts 43 and 44 offset as indicated in FIGURE 1, it is relatively easy to do this. Belts 46 and 48 are driven in their proper direction by the chain 52 which is driven by a separate sprocket on the reduction gear output shaft 27.

In the upper portion of FIGURE 4 the belt feeding means for the large diameter crab leg knuckles and pincer legs or claws is illustrated. The rollers themselves, inasmuch as they are handling large pieces of crab legs and the like, are preferably of a larger diameter, and experience to date indicates that five-inch diameter rollers 66 and 69 will handle the claws and knuckle portions of the legs. It is desirable for such larger diameter rollers to have a resilient facing thickness greater than the thickness of rollers 16 and 18. Such rollers of greater size and having resilient facings of greater thickness increases the gripping effectiveness of the rollers on the larger crab leg portions, namely, the knuckles and the pincers, so as to effect a reliable feed of these larger pieces between the rollers.

The feeding belt arrangement for the rollers 66 and 69 can carry the properly oriented leg parts and discharge them into the nip 67 of such rollers at sufficient speed so that they will jump across the gap between the end of the belts and the rollers, and be gripped by the rollers for feeding into their nip. This gap is required in order to provide space for the crab meat that is expressed from the shells to fall downwardly into the meat trough 32a and so that the shells will be recovered in the shell trough 33a. To insure that larger parts will be definitely engaged between the rollers it has been found desirable to have the rollers spaced apart slightly to provide a more receptive nip 67. For average larger king crab parts, such as the knuckles and claws, a half inch spacing is adequate. The lower roller 66 is mounted on a transverse shaft 68 and the upper roller 69 is mounted upon the transverse shaft 70. Similarly to the crab leg lower roller 18, shaft 68 has a block bearing that slides down the slot 22a until the lower end is reached, limiting any further movement. Shaft 70 of roller 69, like the shaft of upper roller 16, has a sliding bearing block which is normally used with a spacer between it and the bearing block of shaft 68 so as to hold the peripheries of the rollers apart. The hold-down screw 24a threaded through the fixed thrust block 26a will hold the rollers 66 and 69 against the possibility of their being spread farther apart by the pressure of pieces of crab passing between them.

As in the case of the rollers 16 and 18 used for removing the meat from king crab legs, water is supplied to the rollers 66 and 69. For this purpose a water supply pipe 64a extends across the machine above and parallel to the rollers 66 and 69, as shown in FIGURES 4 and 6. From this pipe a plurality of short pipes 65a, preferably of flexible tubing, project downward. These short pipes can be adjusted to direct water jets into the nip 67 at the feed side of the rollers, as shown in FIGURE 6. The force of such jets will be sufficient to wash any meat from the surface of the rollers 66 and 69 into the meat-collecting trough 32a.

A transverse shaft 72 at the right of FIGURE 4, driven by a suitable motor M2 by belt or chain means, carries a plurality of belt pulleys rotatable about a horizontal axis to provide the driving means for the plurality of belts forming the conveying means for the leg knuckles and the crab claws. While any number of belts may be used, it has been found convenient to have a lesser number of conveying channels than are used in the leg portion and as a result three coacting pairs of belts 78 and 79 may be employed.

Spaced inwardly but reasonably close to shaft 72 are two guide sheaves, including sheaves 82, which act in cooperating pairs. These have the effect of changing the position of the crab-engaging runs of the belts 78 and 79 from a horizontal position to a vertical position. As a consequence of the belt twisting effected by such sheaves, the end pulleys for the opposite ends of the belts, indicated at 84 in FIGURE 6, are disposed to rotate about vertical axes. To counteract any tendency for the guide sheaves to crowd belts 78 and 79 off their drive pulleys, rotatable stops 81 are provided for each belt. This arrangement provides a channel for carrying the crab knuckles and claws.

We claim as our invention:

1. A machine for removing the meat from king crab legs, comprising a pair of rollers adjacent to each other, disposed with their axes in substantially parallel coplanar relationship and the surfaces of said rollers cooperatively forming a feed nip at one side of the pair of rollers directly engageable with opposite sides of a king crab leg, each roller of said pair being at least substantially four inches in diameter and at least one roller of said pair having a facing of firm, yieldable resilient material for embracing a king crab leg sufficiently to feed it into the feed nip of said pair of rollers, and drive means connected to rotate the rollers of said pair in opposite directions such that the surfaces of the rollers of said pair in such feed nip are moving toward each other.

2. The machine defined in claim 1, in which the roller facing of firm, yieldable resilient material is at least substantially one-half inch in thickness.

3. The machine defined in claim 1, in which each roller of the pair has a facing of firm, yieldable resilient material at least substantially one-half inch in thickness.

References Cited

UNITED STATES PATENTS

| | | | |
|---|---|---|---|
| 2,660,754 | 12/1953 | Roshko | 17—2 |
| 2,683,281 | 7/1954 | Yanus et al. | 17—2 |
| 2,987,759 | 6/1961 | Lapeyre et al. | 17—2 |

LUCIE H. LAUDENSLAGER, *Primary Examiner.*

SAMUEL KOREN, *Examiner.*